United States Patent [19]

Salerno et al.

[11] Patent Number: 5,664,859
[45] Date of Patent: Sep. 9, 1997

[54] PROJECTION DISPLAY DOCKING SYSTEM

[75] Inventors: Jack P. Salerno, Waban; Ronald Gale; Mark B. Spitzer, both of Sharon, all of Mass.

[73] Assignee: Kopin Corporation, Taunton, Mass.

[21] Appl. No.: 176,921

[22] Filed: Jan. 3, 1994

[51] Int. Cl.⁶ .................................................. G03B 21/00
[52] U.S. Cl. ........................................ 353/119; 353/122
[58] Field of Search ................................ 353/122, 119, 353/31, 37, 84, 103, DIG. 3; 359/83

[56] References Cited

U.S. PATENT DOCUMENTS

| | | | |
|---|---|---|---|
| 4,024,626 | 5/1977 | Leupp et al. | 257/353 |
| 4,105,313 | 8/1978 | Altman | 359/60 |
| 4,270,846 | 6/1981 | Miyamoto | 350/336 |
| 4,429,305 | 1/1984 | Hosokawa et al. | 340/784 |
| 4,740,782 | 4/1988 | Aoki et al. | 340/719 |
| 4,763,993 | 8/1988 | Vogeley et al. | 359/70 |
| 4,769,680 | 9/1988 | Resor, III et al. | 355/43 |
| 4,770,498 | 9/1988 | Aoki et al. | 350/334 |
| 4,782,340 | 11/1988 | Czubatyj et al. | 340/825 |
| 4,818,098 | 4/1989 | Kahn et al. | 353/122 |
| 4,824,210 | 4/1989 | Shimazaki | 353/119 |
| 4,864,390 | 9/1989 | McKechnie et al. | 358/60 |
| 4,904,061 | 2/1990 | Augua | 350/339 |
| 4,909,601 | 3/1990 | Yajima et al. | 350/331 |
| 4,928,123 | 5/1990 | Takafuji | 353/20 |
| 4,952,031 | 8/1990 | Tsundoda et al. | 350/342 |
| 4,963,001 | 10/1990 | Miyajima | 353/60 |
| 4,969,731 | 11/1990 | Ogino et al. | 353/38 |
| 4,976,429 | 12/1990 | Nagel | 353/122 |
| 4,978,952 | 12/1990 | Irwin | 340/795 |
| 4,995,702 | 2/1991 | Argua | 350/331 |
| 5,019,749 | 5/1991 | Ito | 315/224 |
| 5,020,881 | 6/1991 | Matsuda et al. | 350/333 |
| 5,037,196 | 8/1991 | Takafuji et al. | 353/122 |
| 5,041,965 | 8/1991 | Chen | 353/122 |
| 5,052,783 | 10/1991 | Hamada | 359/40 |
| 5,054,910 | 10/1991 | Kazaki et al. | 353/31 |
| 5,056,895 | 10/1991 | Kahn | 359/87 |
| 5,056,912 | 10/1991 | Hamada et al. | 353/38 |
| 5,073,013 | 12/1991 | Sonehara et al. | 359/63 |
| 5,073,772 | 12/1991 | Takafuji et al. | 340/784 |
| 5,075,798 | 12/1991 | Sonehara et al. | 359/490 |
| 5,076,543 | 12/1991 | Mandai | 353/122 |
| 5,076,666 | 12/1991 | Katayama et al. | 359/59 |

(List continued on next page.)

FOREIGN PATENT DOCUMENTS

| | | |
|---|---|---|
| 0 352 636 A3 | 6/1990 | European Pat. Off. . |
| 0 362 776 A2 | 11/1990 | European Pat. Off. . |
| 3142664 A1 | 5/1983 | Germany . |
| 3723181 A1 | 1/1989 | Germany . |
| 3933862 A1 | 4/1991 | Germany . |
| 62-293221 | 12/1987 | Japan . |
| 63-147151 | 6/1988 | Japan . |
| 63-102572 | 7/1988 | Japan . |
| 1237592 | 9/1989 | Japan . |
| 2191057 | 12/1987 | United Kingdom . |

OTHER PUBLICATIONS

Sumiyoshi et al. "Device Layer Transferred Poly-Si TFT Array for High Resolution Liquid Crystal Projector", *IDEM* (1989) pp. 89–165.

Wiley & Sons, "Electronic Display Devices", Publication (1990) (England) Chapter 2.

Stupp, "Flat Information Displays" Conference Presentation, Santa Clara, CA Dec. 11–12, 1990.

International Display Researach Conference, Conference Record, San Diego, CA Oct. 15–17, 1991.

*Primary Examiner*—William Dowling
*Attorney, Agent, or Firm*—Hamilton, Brook, Smith and Reynolds, P.C.

[57] ABSTRACT

A portable docking station system for a liquid crystal display assembly using an arc lamp and a compact optical assembly to project video or data onto a viewing screen. The system includes a color sequential operating system to convert a monochrome liquid crystal display into a high-speed, high resolution, high brightness, color projection display. Video generating and receiving systems as well as an audio system can be incorporated into the docking station to provide a portable presentation system.

36 Claims, 7 Drawing Sheets

U.S. PATENT DOCUMENTS

| | | | |
|---|---|---|---|
| 5,090,800 | 2/1992 | Ushiro | 353/71 |
| 5,092,664 | 3/1992 | Mayatake et al. | 349/41 |
| 5,095,304 | 3/1992 | Young | 340/766 |
| 5,098,183 | 3/1992 | Sonehara | 353/31 |
| 5,102,217 | 4/1992 | Takafuji et al. | 353/84 |
| 5,159,363 | 10/1992 | Brauning | 353/122 |
| 5,161,027 | 11/1992 | Liu | 358/231 |
| 5,161,042 | 11/1992 | Hamada | 359/41 |
| 5,187,510 | 2/1993 | Vogeley et al. | 353/122 |
| 5,206,749 | 4/1993 | Zavracky et al. | 359/59 |
| 5,287,132 | 2/1994 | Suzuki et al. | 353/119 |
| 5,317,436 | 5/1994 | Spitzer et al. | 359/83 |
| 5,321,450 | 6/1994 | Shapiro et al. | 353/69 |
| 5,347,324 | 9/1994 | Sasaki et al. | 353/119 |
| 5,376,979 | 12/1994 | Zavracky et al. | 353/122 |
| 5,396,304 | 3/1995 | Salerno et al. | 353/122 |

PROJECTION DISPLAY DOCKING SYSTEM

BACKGROUND OF THE INVENTION

Flat-panel and projection displays are being developed which utilize liquid crystals materials to produce high quality images. These displays are expected to supplant cathode ray tube (CRT) technology and provide a more highly defined television picture. A promising route to large scale high quality liquid crystal displays (LCDs), for example, is the active-matrix approach in which thin-film transistors (TFTs) are co-located with LCD pixels.

Projection displays employing LCDs generally include five different components: a white light source, a condensing optical system mounted an optical system configured to enlarge the image from the LCD onto a viewing surface and in certain systems the viewing surface as well.

Each LCD includes a layered structure having polarizing filters and a circuit panel. A volume between the circuit panel and one filter plate is filled with a liquid crystal material. This material will rotate the polarization of light when an electric field is applied across it between the circuit panel and a ground affixed to the filter plate. Thus, when a particular pixel of the display is turned on, the liquid crystal material rotates polarized light being transmitted through the material so that it will pass through a second polarizing filter. Alternatively, application of the field can also be used to further limit the amount of light transmitted through the LCD to define an image.

A need exists, however, for improved LCD systems having the desired resolution and speed, and providing for ease of use and reduced cost of fabrication.

SUMMARY OF THE INVENTION

The present invention relates to a docking system for projection display having a housing in which the light source, imaging system, and projection optics can be configured within a compact volume. The exterior of the housing includes a molded plastic outer shell having a locking mechanism that permits a liquid crystal display assembly to be mounted and secured to the docking system. A liquid crystal display assembly suitable for docking with the present docking system is described in several patent applications which are hereinafter incorporated by reference.

This liquid crystal display assembly includes an outer housing, and a liquid crystal display slide that can be moved from a position within the housing to a position outside the housing. When mounted on a standard slide projector, the display assembly can be locked onto the carousel and the display slide moved into the slide chamber of the standard projector. However, these standard slide projectors are typically too bulky and heavy and have a light source not optimally suited for use with the liquid crystal display.

The system is suitable for multimedia applications and has connectors and electronic to provide imaging of television signals, VCR video and audio, as well as project images from computers, disk drives, and CD ROM drives. Audio speakers can be incorporated into the docking station to provide an audio presentation capability.

In contrast to the standard slide projector the present invention comprises an outer housing designed to mate and lock with the external shape of the housing of the liquid crystal display assembly and includes a more compact geometry of the optical components and can include electronic components used to provide video and data input to the display for projection onto a viewing surface. The housing can be about 8 inches deep, by 8 inches long, by 3 inches high in the compact embodiment. It is desirable to have the total volume of the docking station occupy less than 300 cubic inches and preferably less than 220 cubic inches to provide portability.

In a further embodiment of the docking system, optical and electronic systems are included to provide for color sequential operation of the display. Alternatively, the liquid crystal display slide can be a color active matrix display.

The system involves presenting an image to a person on a screen which renders the image visible to the observer in such a way that the image is erect and correct left to right. The source of light for a preferred embodiment of this system is a arc lamp and in particular can be a metal halide light source or a xenon arc lamp or similar light source.

Arc lamps produce less infrared light than the tungsten filament lamps used in conventional slide projectors, and thus need less infrared filtering and produce less heat. This can reduce the amount of active cooling required for the lamp, or can eliminate the need for a cooling fan entirely, relying instead on passive cooling fins for venting heat from the lamp. Standard tungsten lamps have a color temperature of about 3200 Kelvin. Arc lamps have a color temperature in the range of 4000 to 9000 Kelvin which is more highly suited for an active matrix liquid crystal display projection system. A metal halide lamp, for example, also has higher brightness per watt of power and a longer lifetime. The lamps are used with dichroic parabolic reflectors to further vent infrared radiation and collect as much of the usable visible light as possible.

The present system also includes a power supply and an electronic ballast and starter for the arc lamp. The ballast circuit controls the current across the lamp and the starter circuit provides high voltage pulses sufficient to start the arc before reducing the voltage to standard operating levels. This circuitry can be included in the power supply system or incorporated into the printed circuit board mounted in the housing.

BRIEF DESCRIPTION DRAWINGS

The above and other features of the invention including various details of construction and combinations of parts will now be more particularly described with referenced to the accompanying drawings and pointed out in the claims. It will be understood that the particular projection display docking system embodying the invention is shown by way of illustration only and not as a limitation of the invention. The principles and features of this invention may be employed and varied in numerous embodiments without departing from the scope of the invention.

DETAILED DESCRIPTION OF PREFERRED EMBODIMENTS OF THE INVENTION

Figure 1:
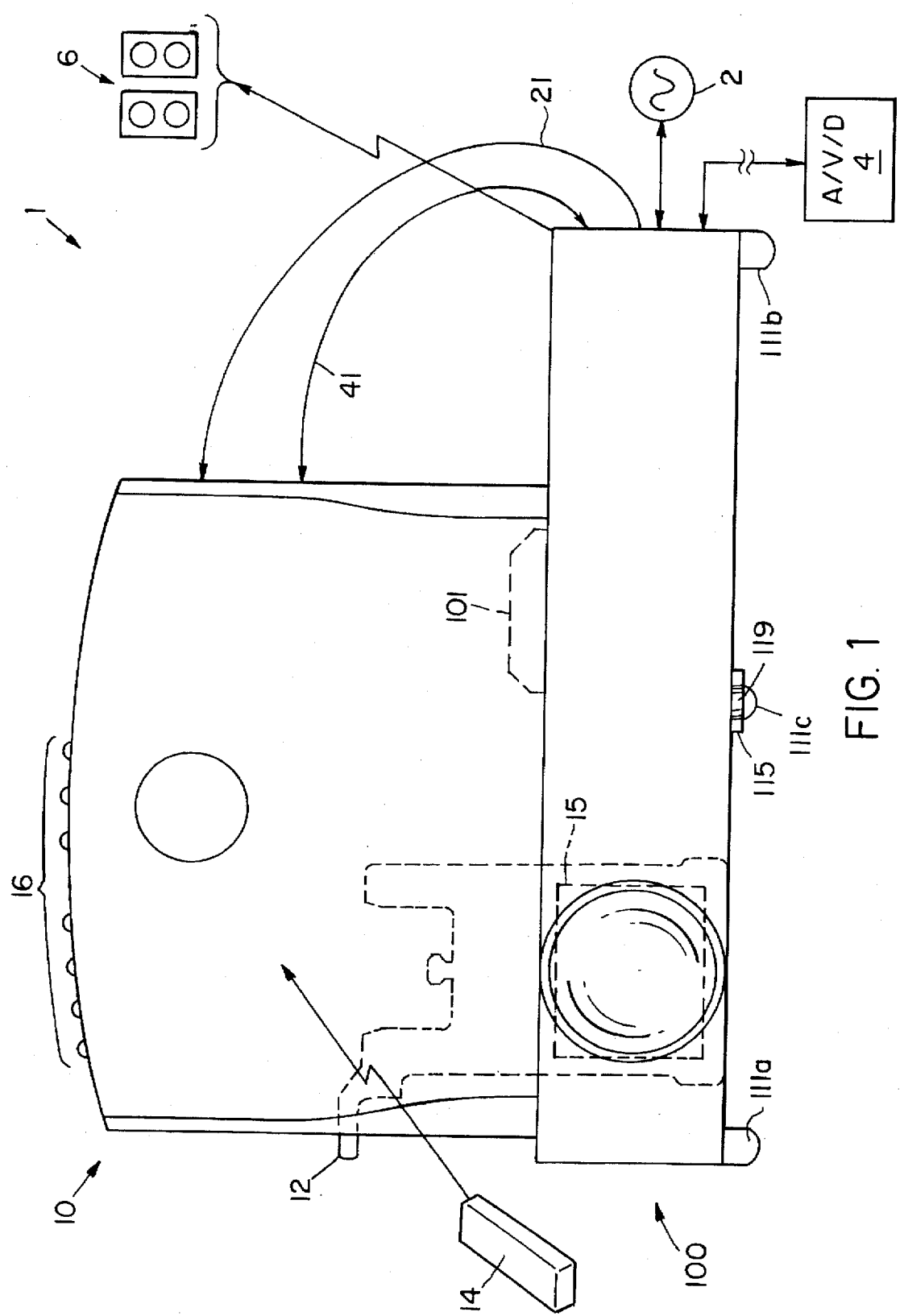
FIG. 1 is a front view schematic diagram of a preferred embodiment of the invention.

FIG. 1 is a front view schematic diagram of a preferred embodiment of the invention. A projection display system 1 includes a slide projector mountable display housing 10 and a projection display docking station 100. The display housing 10 is preferably a slide projector mountable light valve display as described in U.S. patent application Ser. No. 08/106,071 filed on Aug. 13, 1993, and now U.S. Pat. No. 5,376,979 and U.S. Ser. No. 07/872,297 filed on Apr. 22, 1992, and now U.S. Pat. No. 5,317,436 the contents of both being incorporated herein by reference. Briefly, the display housing 10 is mounted to a hub 101 (shown in phantom) of the docking station 100 and includes a light valve display panel 15 (shown in phantom) that is actuated by a sliding mechanism 12. As shown the sliding mechanism 12 is positioned such that the light valve display panel has been lowered into the docking station 100. The docking station includes main housing 5. When the sliding mechanism 12 is raised, the light display panel is secured within the display housing 10. A user can manipulate the image generated on the light valve display panel using control buttons 16 on the surface of the housing 10 or by using a remote control device 14.

The docking station 100 includes the optical components required to project the image formed on the light valve display panel 15 onto a viewing surface. The docking station is coupled to an external power supply 2. The docking station 100 is also coupled to a remote video source 4, which provides video signals and can also provide audio and data signals to the display system 1. In addition, the video source 4 can receive control signals(e.g. mouse signals) from the display system 1. The video source 4 can be a computer, a video player, a television station, or any other video source coupled to the docking station 100 by a direct wire, an antenna or both. Circuitry in the docking station 100 separates the audio signals from the input stream and generates analog signals to drive remote speakers 6. Circuitry within the docking station 100 also separates video signals from the input stream, possibly manipulating the video data stream, and provides the video information over coupling 41 to the display housing 10 for actuating the light valve display panel 15. Electrical power required by the light valve display panel and associated circuitry is provided from the docking station 100 to the display housing 10 over coupling 21.

The docking station 100 is supported by three foot pads 111. In a particular preferred embodiment, two pads 111a, 111b are positioned at the rear corners of the docking station 100. The third pad 111c is mounted on an extendable bracket 115. The third pad 111c can be extended from the front of the docking station 100 using the bracket 115. Once positioned, a thumb screw 119 can be used to adjust the projection angle of the projection system 1.

The optical elements inside the docking station 100 include a light source and appropriate lenses. Various arrangements of optical elements can be used to practice the invention.

Figure 2:
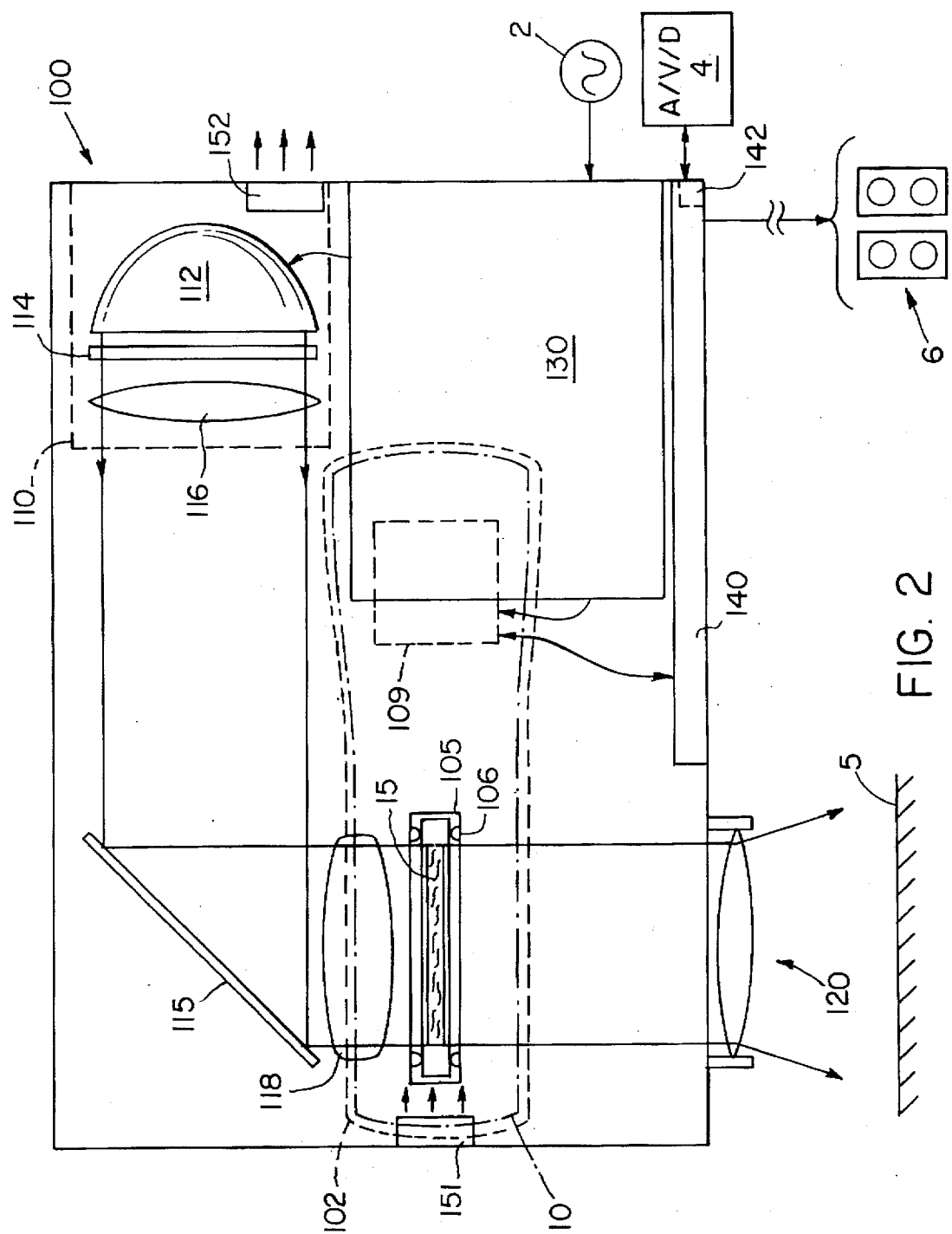
FIG. 2 is a schematic diagram illustrating a preferred optical arrangement for the docking station 100 of FIG. 1.

FIG. 2 is a schematic diagram illustrating a preferred optical arrangement for the docking station 100 of FIG. 1. As illustrated, there is a white light source 112, an infrared filter 114, a collecting lens 116, a mirror 115, and a field lens 118. The infrared filter 114 absorbs or reflects substantially all infrared radiation emitted by the light source 112, while passing the visible light. The collecting lens 116 focuses the cool light emitted by the infrared filter 114 into a collimated beam of light. The mirror 115 reflects the collimated beam of light toward the liquid crystal display panel 15. The mirror 115 can also filter infrared radiation. The field lens 118 focuses the reflected light beam from the mirror 115 onto the display panel 15. The image formed on the display panel 15 is projected by projection optics 120 onto a viewing surface 5.

The display panel 15 is disposed within a receiving gate 105 of the docking station 100. The display panel 15 is held firmly in place by spring clips 106. The relative position of the slide projector mountable light valve display housing 10 relative to the docking station 100 is shown in phantom. A power supply 130 drives the light source 112. The circuitry 140 includes an optional receiver 142 for receiving wireless video transmissions. Circuitry 140 separates the audio signals from the input stream and outputs the audio signals to a speaker subsystem 6. The circuitry 140 also provides video signals to the light valve circuitry within the display housing 10 over coupling 41. In another preferred embodiment, the display housing 10 is coupled to the docking station 100 by a connector 109, which can be mounted on the hub 101.

It should be apparent that there are a number of heat dissipating components packed within a confined area. Furthermore, the display panel 15 can be adversely affected by heat buildup. Accordingly, the docking station 100 is provided with a ventilation system. As illustrated, one fan 151 creates an air flow across the display panel 15 and a second fan 152 draws air from the interior of the docking station 100. In particular, the second fan 152 is positioned near the light source 112 and the power supply 130, which are the primary heat generators within the docking station 100. Other appropriate thermal management techniques are considered to be within the scope of this invention.

Figure 3:
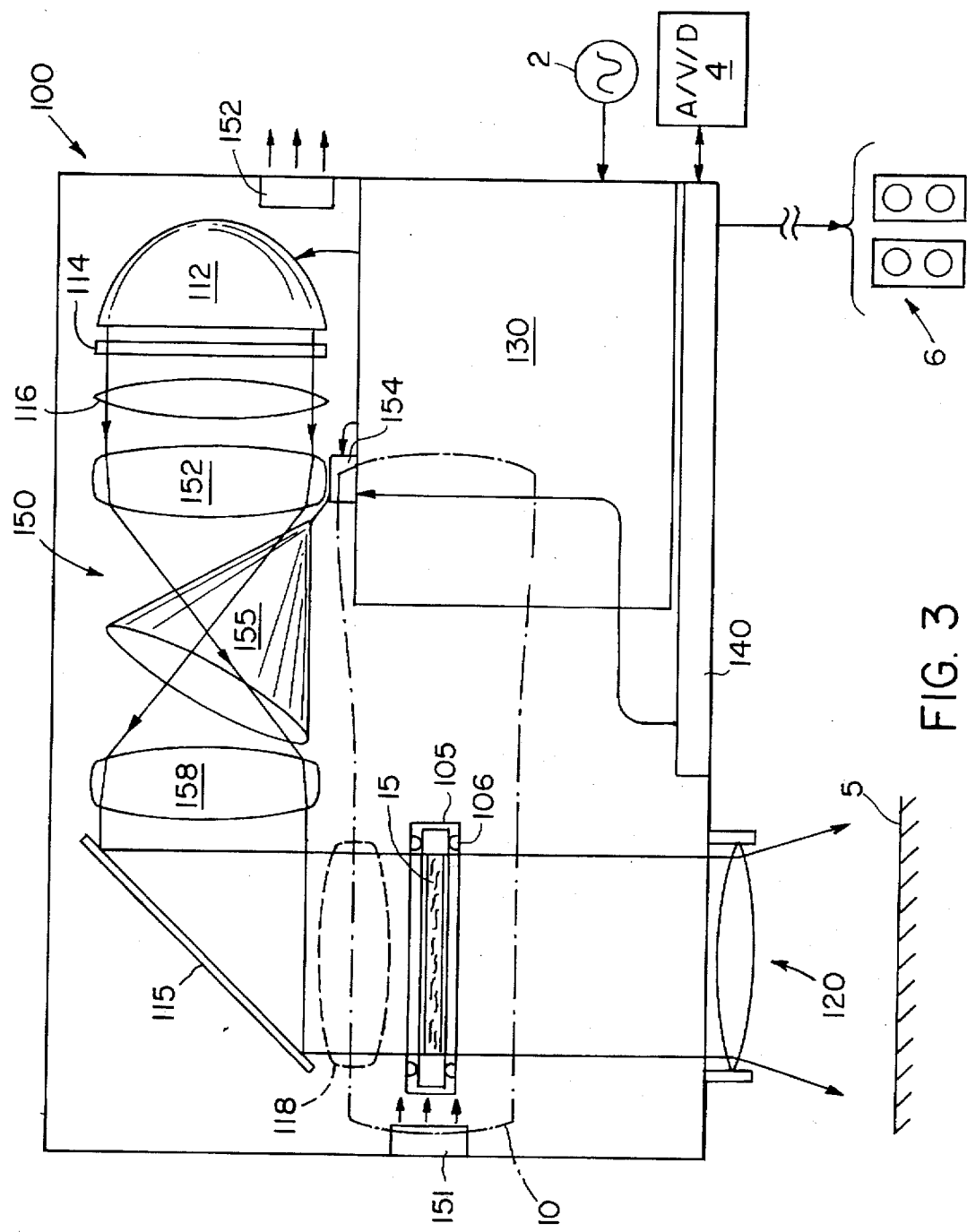
FIG. 3 is a schematic diagram illustrating a preferred optical arrangement for the docking station 100 of FIG. 1.

FIG. 3 is a schematic diagram illustrating a preferred optical arrangement for a color display docking station 100 of FIG. 1. As illustrated the optical arrangement is similar to the optical arrangement illustrated in FIG. 2, except for the introduction of a sequential color optical element 150. In a preferred embodiment, a sequential color system includes a rotating color cone 155 that is rotated about its center axis by an actuator 154 in response to timing signals provided by the circuitry 140. The color cone 155 is segmented into red, green, and blue colored sides. A reducing lens 152 focuses the white light such that the light passes through the sides of the cone and exits through the face of the cone where the now colored light is collected and directed to the mirror 115 by a field lens 158. Preferably the field lens 158 focuses the light on the light valve 15, making a second field lens 118 (shown on phantom) optional. The circuitry 140 provides timing signals to the actuator 154 to cause the cone 155 to rotate such that on each sequential frame, the light passes a different colored segment.

Figure 4:
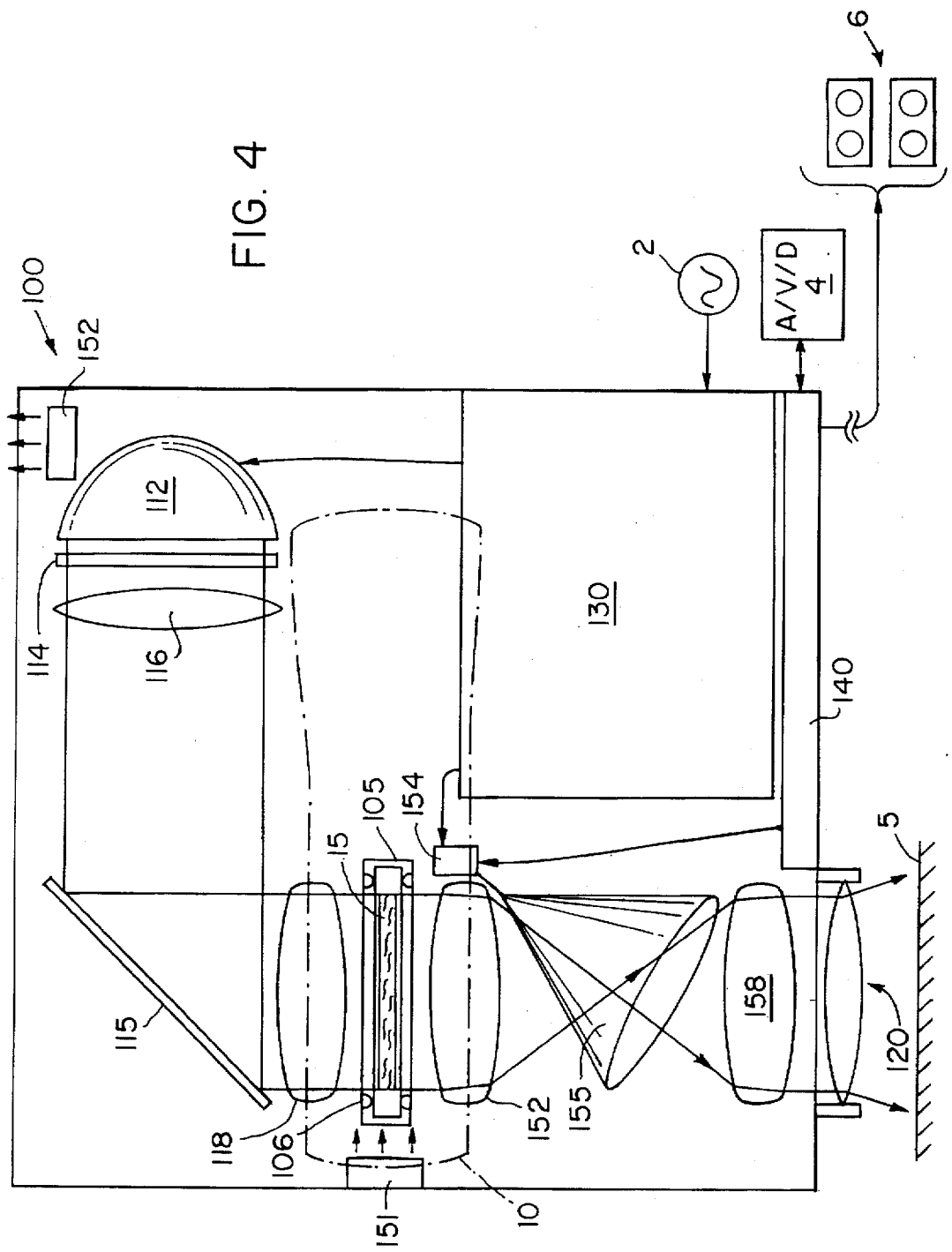
FIG. 4 is a schematic diagram illustrating another preferred optical arrangement for a color display docking station 100 of FIG. 1.

FIG. 4 is a schematic diagram illustrating another preferred optical arrangement for a color display docking station 100 of FIG. 1. The sequential color module 150 is illustrated being disposed between the display panel 15 and the projection optic 120. Indeed, the color sequential system can be integrated with the projection optics 120. In this embodiment, the physical dimensions of the docking station 100 can be reduced in comparison to FIG. 3.

Figure 5:
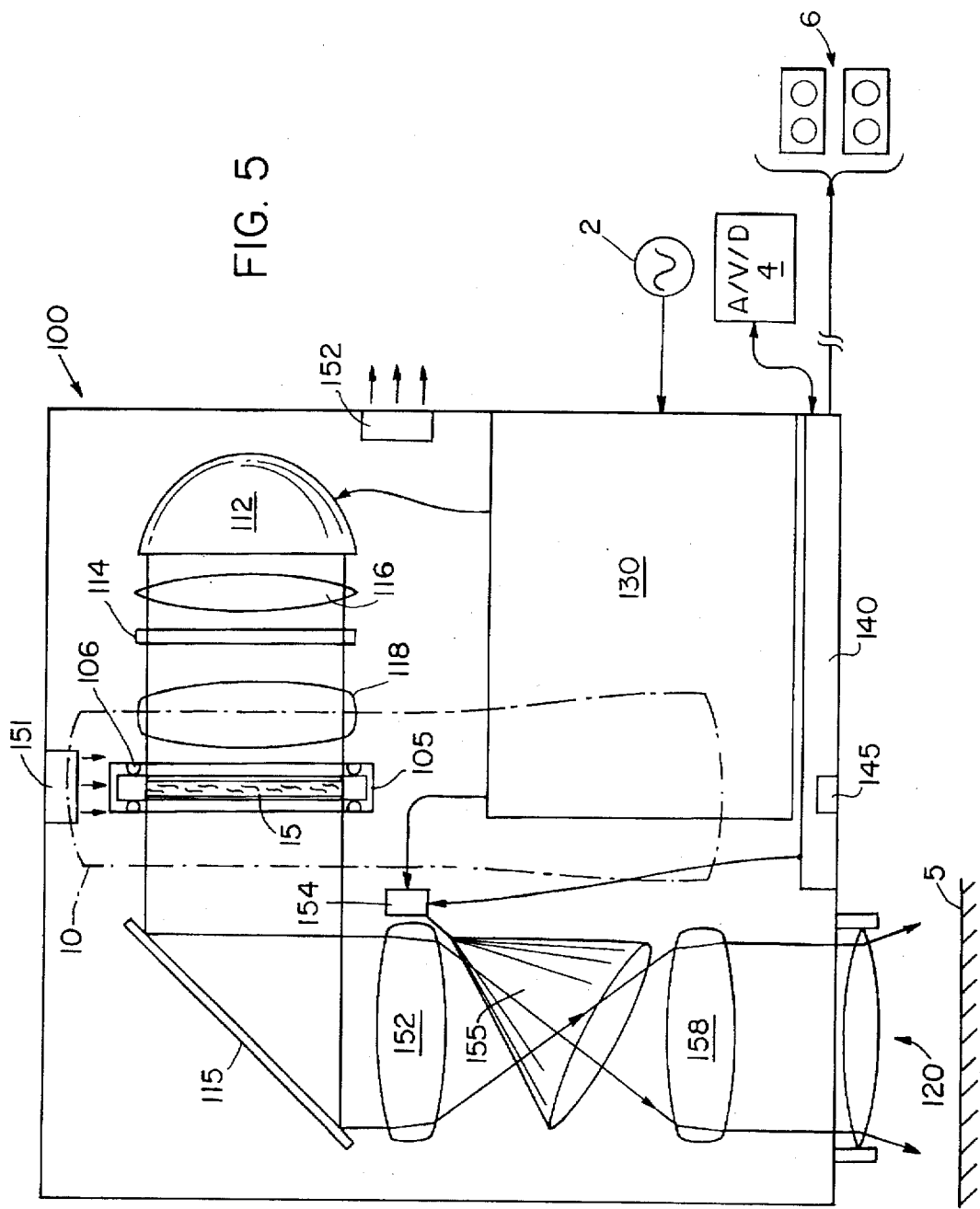
FIG. 5 is a schematic diagram illustrating another preferred optical arrangement for a color display docking station 100 of FIG. 1.

FIG. 5 is a schematic diagram illustrating another preferred optical arrangement for a color display docking station 100 of FIG. 1. In this embodiment the mirror 115 is position to reflect image light from the display panel 15. As in FIG. 4, the sequential color module is disposed just prior to the projection optics. By introducing a mirror after the image is formed, a mirror image of the generated image will be displayed. To correct for this mirroring, a buffer 145 is disposed between the video input stream from the video source 4 and the imaging electronics of the light valve display panel. The buffer is a First-In-Last-Out (FILO) buffer operating on each scan line of the display panel. That is, the video signal for the first column in each scan line will be the last pixel actuated on the display panel and the last column will be the first pixel actuated on the display panel.

In the preferred embodiment of the invention, the light source 112 is preferably a 120 watt metal halide lamp suitable for projection in ambient room light. Alternatively, a 60 Watt metal halide lamp is used for projection in a darkened room. Other lamp types can be substituted. In preferred embodiment of the invention, the lamp 112 is detachable from the docking station 100 for replacement.

In preferred embodiments of the invention the projection optics 120 comprises a motorized zoom lens that is actuated by a user. Alternatively the zoom lens can be manually operated. In a particular preferred embodiment of the invention the projection optics 120 is a standard Kodak-supplied slide projector zoom lens. It is understood that other types of fixed and zoom lenses can be substituted.

Although preferred embodiments of the invention use a color cone for sequential color, other color schemes can be used. For example, the light valve display panel 15 can be a color liquid crystal display or other transmissive color light valve panels. Alternatively, liquid crystal color filters can be employed in the liquid crystal display panel. Preferred liquid crystal color filters are described in U.S. Pat. No. 5,132,826, entitled "Ferroelectric Liquid Crystal Tunable Filters and Color Generation" by Johnson et al. incorporated herein by reference. In a preferred embodiment of the invention, the liquid crystal filters replace either of the two polarizers normally present in the light valve display panel 15.

Figure 6:
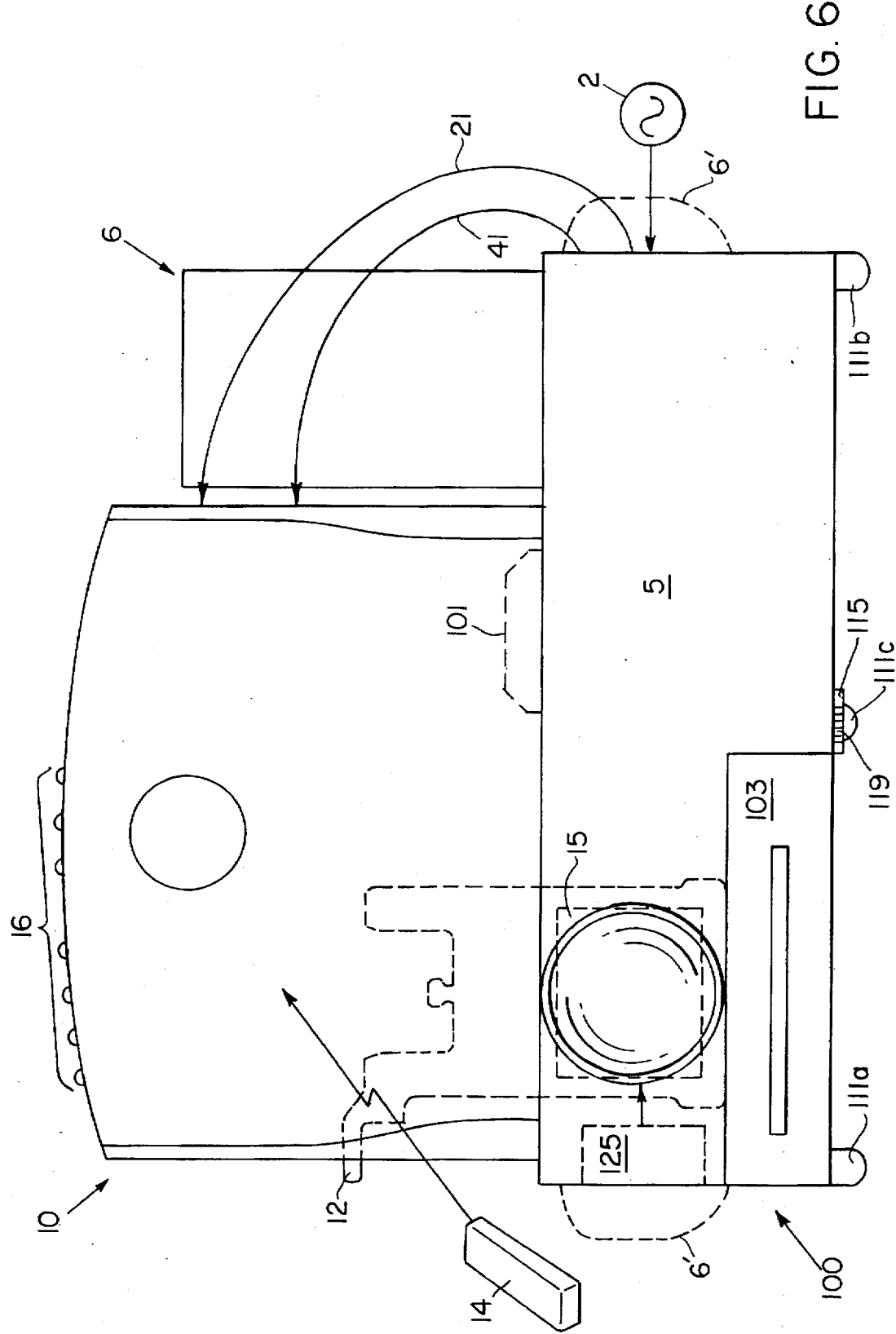
FIG. 6 is a front view schematic diagram of a self-contained docking system.

Although the above description of the invention describe a remote video source 4, audio, video, and data signals can provided by a local video source. Examples of local video sources are memory devices such as a computer disk, a CD-ROM, a laser disk, or other similar video storage devices. The circuit board 140 can also have a memory for storing video and audio data which can be replayed from memory using the docked projection system using the remote control. As illustrated in FIG. 6, drives 103 for these video storage devices are integrated into the docking station 100 so the display system operates as self-contained display device. Furthermore, a speaker subsystem 6 can be fixed to the docking station 100. These can be detachable or can be incorporated into the main housing body 5 as illustrated by side mounted speakers 6' which are directed upwards in this illustration. As a convenience, the projection zoom lens 120 can be actuated by a user using an electric motor 125 coupled to the zoom lens 120. The motor can be used to pop the end of the lens out of the housing into position for use and to focus the projected image onto a screen that can be any size in the range of a few inches to twenty feet.

Figure 7A:
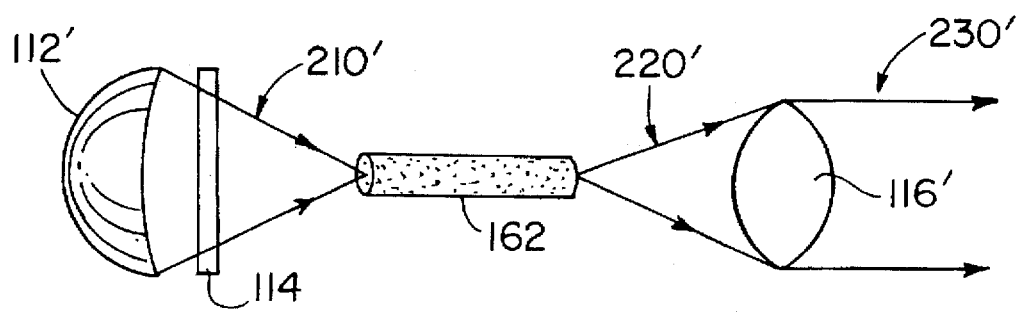
FIGS. 7A-7C illustrates optical mixers used to evenly distribute light over the cross-sectional area of the light path prior to transmission throught the LCD light valve.
Figure 7B:
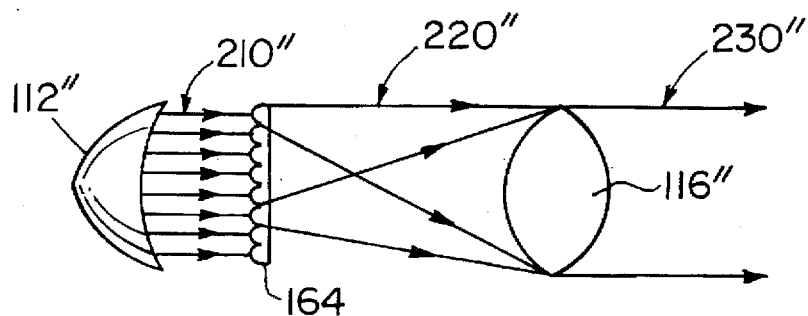
Figure 7C:
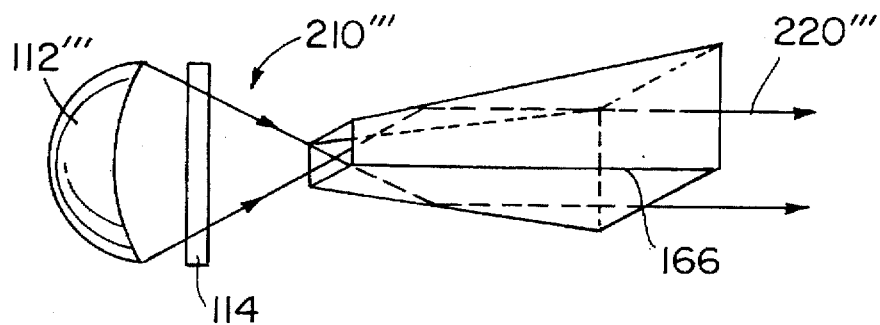

To produce a uniformly illuminated image, light incident on the light valve display panel 15 must be uniform in intensity over the surface of the light valve display panel 15. However, it is likely that the metal halide lamp 112 produces light of a non-uniform intensity. Consequently, the white light from the lamp 112 must be mixed to produce a uniform light source. FIGS. 7A–7C illustrate preferred embodiments of light mixing devices.

FIG. 7A illustrates the use of a light pipe 162 to mix light. An elliptical reflecting lamp 112' focuses the cool white light onto the proximal face of the light pipe 162. Light 220" pipe 162 can be a glass rod or a hollow glass tube. The light exiting the light pipe 162 becomes incident on a collecting lens 116', which collimates the light 230'.

FIG. 7B illustrates the use of a lens array 164 to mix light. A parabolic reflecting lamp 112" generates an essentially collimated beam of light, which becomes incident on the lens array 164. Light incident on each lens in the lens array 164 is focused 220" across a surface of a collecting lens 116" such that an equal portion of the light incident on each lens of the lens array 164 is summed together at the collecting lens 116. In a particular preferred embodiment, the lens array 164 is an infrared filter.

FIG. 7C illustrates the use of a light expander to mix light. The light expander 166 preferably has four side walls having mirrored surfaces on the inside. Light 220'" from a light source 112'" enters the light expander 166, where the light is reflected by the mirrored surface to mix and collimate the light 220'".

Equivalents

Those skilled in the art, will know or will be able to ascertain using no more than routine experimentation, many equivalence to the specific embodiments of the invention described herein. These and all equivalence are intended to be encompassed by the following claims.

We claim:

1. A docking station for a liquid crystal display assembly comprising:

a housing for the docking station, the housing having an opening through which a liquid crystal display panel can be inserted;

a support element on the housing, the support element being capable of holding the display assembly relative to the housing;

an image storage device mounted within the housing for providing a selectable image from storage;

an electrical coupler between the housing and the display assembly for electrically connecting the image to the display panel for forming the selected image;

an arc lamp light source mounted within the housing that emits light directed through a liquid crystal display panel inserted through the opening;

a projection optical system mounted within the housing and which is optically coupled to the display panel when the display panel is inserted in the opening, the projection optical system projecting the selected image formed on the display panel onto an exterior viewing surface; and a mirror positioned within the housing, the mirror reflecting light from the light source along a first optical path onto a second optical path extending through the projection optical system.

2. The docking station of claim 1 further comprising a power supply mounted within the housing and a starter circuit for the arc lamp.

3. The docking station of claim 1 further comprising a removable light source holder that can be removed from the housing.

4. The docking station of claim 1 further comprising a cradle in an upper housing surface in which the display assembly can be positioned.

5. The docking station of claim 1 further comprising a mixer that optically mixes light emitted by the arc lamp light source.

6. The docking station of claim 1 wherein the arc lamp comprises a metal halide light source.

7. The docking station of claim 1 wherein the arc lamp comprises a xenon arc lamp.

8. The docking station of claim 1 wherein the electrical coupler comprises a first electrical connector mounted on the housing to electrically connect with a second electrical connector on the liquid crystal display assembly.

9. The docking station of claim 8 wherein the first electrical connector underlies the display assembly when the display assembly is mounted on the docking station.

10. The docking station of claim 1 further comprising a video circuit disposed within housing and electrically coupled to the display panel for forming the selected image on the display panel.

11. The docking station of claim 1 wherein the housing has a volume of less than about 300 cubic inches.

12. The docking station of claim 1 wherein the image storage device comprises a reading device for reading stored images from a storage medium.

13. The docking station of claim 12 wherein the reading device is a disk drive.

14. The docking station of claim 1 further comprising a passive cooling system to dissipate thermal energy from the light source.

15. The docking station of claim 14 wherein the precise cooling system includes cooling fins coupled to the light source.

16. The docking station of claim 14 wherein the passive cooling system includes an arc lamp having dichroic reflectors.

17. A docking station for a liquid crystal display assembly comprising:
- a housing for the docking station, the housing having an opening through which a liquid crystal display can be inserted;
- a light source mounted within the housing that emits light directed through a liquid crystal display panel inserted through the opening;
- a projection optical system mounted within the housing and which is optically coupled to the display panel when the display panel is inserted in the opening, the projection optical system projecting an image formed on the display panel onto an exterior viewing surface; and
- a sequential light system mounted within the housing such that light of different frequencies are sequentially directed through the projection optical system.

18. The docking station of claim 17 further comprising a power supply mounted within the housing and a starter circuit for the arc lamp.

19. The docking station of claim 17 further comprising a removable light source holder that can be removed from the housing.

20. The docking station of claim 17 further comprising a cradle in an upper assembly surface in which the display housing can be positioned.

21. The docking station of claim 17 wherein the sequential light system comprises a color wheel.

22. The docking station of claim 17 wherein the sequential light system comprises a liquid crystal filter system.

23. The docking station of claim 17 further comprising a video circuit disposed within the housing and electrically coupled to the display panel for forming images on the display panel.

24. A method of docking a liquid crystal display assembly comprising:
- providing a housing for a docking station, the housing having an opening through which a liquid crystal display panel can be inserted, an arc lamp light source mounted within the housing, a video storage device within the housing for providing selectable video signals from storage and a projection optical system mounted within the housing;
- mounting the display assembly onto a surface of the housing such that the display panel is inserted through the opening and into the housing to optically couple the light source to the liquid crystal display;
- electrically coupling the video circuit to the display panel;
- forming an image on the display panel using signals from the video storage device; and
- projecting the formed image through the optical system onto an exterior viewing surface.

25. The method of clam 24 further comprising providing a wireless receiver within the housing to receive video or television signals from a transmitter.

26. The method of claim 24 wherein the step of mounting comprises inserting the display assembly into a cradle in an upper housing surface.

27. The method of claim 24 wherein the step of projecting comprises actuating a sequential light system to project color images onto the viewing surface.

28. The method of claim 24 wherein the step of providing a housing comprises providing a housing having a volume of less than about 300 cubic inches.

29. The method of claim 24 wherein the step of providing a video storage device includes providing a reading device mounted within the housing for reading stored images from a storage medium for forming on the display panel.

30. The method of claim 29 wherein the reading device is a disk drive.

31. The method of claim 24 further comprising the step of passively cooling the light source to dissipate thermal energy.

32. The method of claim 31 wherein the step of passively cooling comprises coupling cooling fins to the light source.

33. The method claim 31 wherein the step of passively cooling comprises providing arc lamps having dichroic reflectors.

34. A docking station for a liquid crystal display assembly comprising:
- a housing for the docking station, the housing having an opening through which a liquid crystal display panel can be inserted and a volume of less than about 220 cubic inches;
- a support element on the housing, the support element being capable of holding the display assembly relative to the housing;
- an arc lamp light source mounted within the housing that emits light directed through a liquid crystal display panel inserted through the opening;
- a projection optical system mounted within the housing and which is optically coupled to the display panel when the display panel is inserted in the opening, the projection optical system projecting an image formed on the display panel onto an exterior viewing surface; and
- a mirror positioned within the housing, the mirror reflecting light from the source along a first optical path onto a second optical path extending through projection optical system.

35. The display station of claim 34 further comprising a disk drive mounted within the housing for reading stored images from a storage disk for forming on the display panel.

36. The docking station of claim 34 further comprising a passive cooling system wherein the arc lamp has dichroic reflectors and cooling fins.

* * * * *